(12) United States Patent
Pellinen et al.

(10) Patent No.: US 11,702,177 B2
(45) Date of Patent: Jul. 18, 2023

(54) PROPULSION UNIT

(71) Applicant: ABB Oy, Helsinki (FI)

(72) Inventors: Petri Pellinen, Helsinki (FI); Ari Turunen, Helsinki (FI); Sakari Siipilehto, Helsinki (FI)

(73) Assignee: ABB Oy, Helsinki (FI)

( * ) Notice: Subject to any disclaimer, the term of this patent is extended or adjusted under 35 U.S.C. 154(b) by 178 days.

(21) Appl. No.: 17/219,150

(22) Filed: Mar. 31, 2021

(65) Prior Publication Data
US 2021/0316832 A1   Oct. 14, 2021

(30) Foreign Application Priority Data
Apr. 8, 2020   (EP) ..................... 20168637

(51) Int. Cl.
*B63H 5/125*   (2006.01)
*B63H 23/32*   (2006.01)

(52) U.S. Cl.
CPC .......... *B63H 5/125* (2013.01); *B63H 23/321* (2013.01); *B63H 2005/1258* (2013.01); *B63H 2023/325* (2013.01)

(58) Field of Classification Search
CPC .............. B63H 5/125; B63H 23/321; B63H 2005/1258; B63H 2023/325; B63H 5/1252; B63H 20/002; F16C 2237/00; F16C 2326/30; F16C 17/26; F16C 23/045; F16C 17/04; F16C 17/02
See application file for complete search history.

(56) References Cited

U.S. PATENT DOCUMENTS 5,408,155 A      4/1995   Dickinson et al.
9,216,804 B2 *  12/2015   van der Laan ........ B63H 23/02

FOREIGN PATENT DOCUMENTS

DE   0786402 A2 *   7/1997   ............. B63H 5/10
EP   2279114 A1     2/2011
FI      124311 B *  6/2014   ............. B63H 23/32
KR   20110044995 A * 5/2011   ............. F16C 35/073

OTHER PUBLICATIONS

Extended European Search Report; Application No. 20168637.5; Completed: Sep. 24, 2020; dated Oct. 12, 2020; 5 Pages.

* cited by examiner

*Primary Examiner* — Anthony D Wiest
(74) *Attorney, Agent, or Firm* — Whitmyer IP Group LLC

(57) ABSTRACT

A propulsion unit includes a housing supported on a vessel. A propeller shaft extends in the housing. The propeller shaft is rotatably supported with a first bearing and a second bearing. A propeller is attached to at least one end of the propeller shaft. The first bearing includes a first radial bearing and a first thrust bearing. The first radial bearing is a sliding bearing positioned axially inside the first thrust bearing. The first bearing is positioned at the first end of the housing and the second bearing being positioned at the second end of the housing or vice a versa.

19 Claims, 4 Drawing Sheets

PROPULSION UNIT

TECHNICAL FIELD

The present invention relates to a propulsion unit.

BACKGROUND

Propeller shafts in propulsion units may be rotatably supported with roller or sliding bearings.

Deep groove ball bearings are the most common type of bearings in electric machines. A deep groove ball bearing can handle both radial and thrust loads. The low frictional torque in deep groove ball bearings make them to especially suitable for high speeds. Cylindrical roller bearings are used in applications where they must hold heavy radial loads. The contact between the inner and outer race in a cylindrical roller bearing is not a point as in ball bearings but a line. This spreads the load over a larger area, allowing the cylindrical roller bearing to handle much greater radial loads than a ball bearing. Cylindrical roller bearings are not designed to handler much thrust loading.

Sliding bearings have a practically infinite life provided that its operation maintains within specific conditions. Electric machines have sliding bearings at both ends. The bearing on the drive end may be a guide bearing being able to tolerate a limited non-axial force. The bearing at the non-drive end may be isolated. The bearings may be rigidly mounted to each end shield of the electric machine. The bearing housing may be made of cast iron. Tapped holes for a thermometer, an oil inlet, an oil outlet, and an oil level indication may be provided on both sides of the bearing house. The sliding bearings may be lubricated by hydrodynamic lubrication, which can be of a self-lubricating or of an oil circulation type. The bearing shells may be spherically seated in the bearing house. The oil flow of self-lubricated bearings may be guaranteed by a central arrangement of the oil ring. A precise shell seating also provides for a good heat transfer between the bearing shell and the bearing house. The bearing shell may consist of a steel body lined with white metal. Bearings with a circulating oil system may also be equipped with an oil ring. The oil ring may provide a safe running of the electric motor in case of a power failure in which the rotor of the electric motor continues to rotate for some time after the power failure.

A sliding bearing (sometimes also called plain bearing, slide bearing, sleeve bearing, solid bearing, journal bearing or friction bearing) is the simplest type of bearing, comprising just a bearing surface and no rolling elements. Therefore, the journal, i.e., the part of the shaft in contact with the bearing, slides over the bearing surface.

Electric machines may also be provided with a radial bearing and a thrust bearing at one end of the shaft of the electric machine. The radial bearing and the thrust bearing may be enclosed in a common bearing house.

SUMMARY

An object of the present invention is to achieve an improved propulsion unit.

The propulsion unit according to the invention is defined in the claim.

The propulsion unit generally comprises a housing being supported with a support arm on a hull of a vessel, the housing having a first end and a second opposite end in a longitudinal direction of the housing, a propeller shaft extending in the longitudinal direction of the housing within the housing, the propeller shaft having an axis of rotation and being rotatably supported within the housing with a first bearing and a second bearing, a propeller being attached to at least one end of the propeller shaft outside the housing.

The propulsion unit may be characterized in that the first bearing comprises a first radial bearing and a first thrust bearing, the first radial bearing being a sliding bearing positioned axially inside the first thrust bearing, the first bearing being positioned at the first end of the housing and the second bearing being positioned at the second end of the housing or vice a versa.

The first radial bearing being positioned axially inside the first thrust bearing makes it possible to provide access to the first bearing from the inside of the housing. The first bearing may thus be serviced and/or changed from the inside of the housing without dry docking of the vessel. The first radial bearing and the first thrust bearing may both be changed and/or serviced from the inside of the housing.

The position of the first radial bearing axially inside the first thrust bearing makes it possible to service and/or change the first radial bearing from the inside of the housing either from an axial direction or from a radial direction. The construction of the first radial bearing may be such that it can be serviced and/or changed from an axial direction or such that it can be serviced and/or changed from a radial direction.

The position of the first radial bearing axially inside the first thrust bearing makes it possible to service and/or change the first thrust bearing from the inside of the housing from a radial direction.

The position of the first radial bearing axially inside the first thrust bearing leaves room in the radial direction outside the radial outer surface of the first radial bearing and outside the radial outer surface of the first thrust bearing. Room is also left in the axial direction inside the axial inner end of the first radial bearing.

BRIEF DESCRIPTION OF THE DRAWINGS

In the following the invention will be described in greater detail by means of preferred embodiments with reference to the attached drawings, in which.

DETAILED DESCRIPTION

Figure 1:
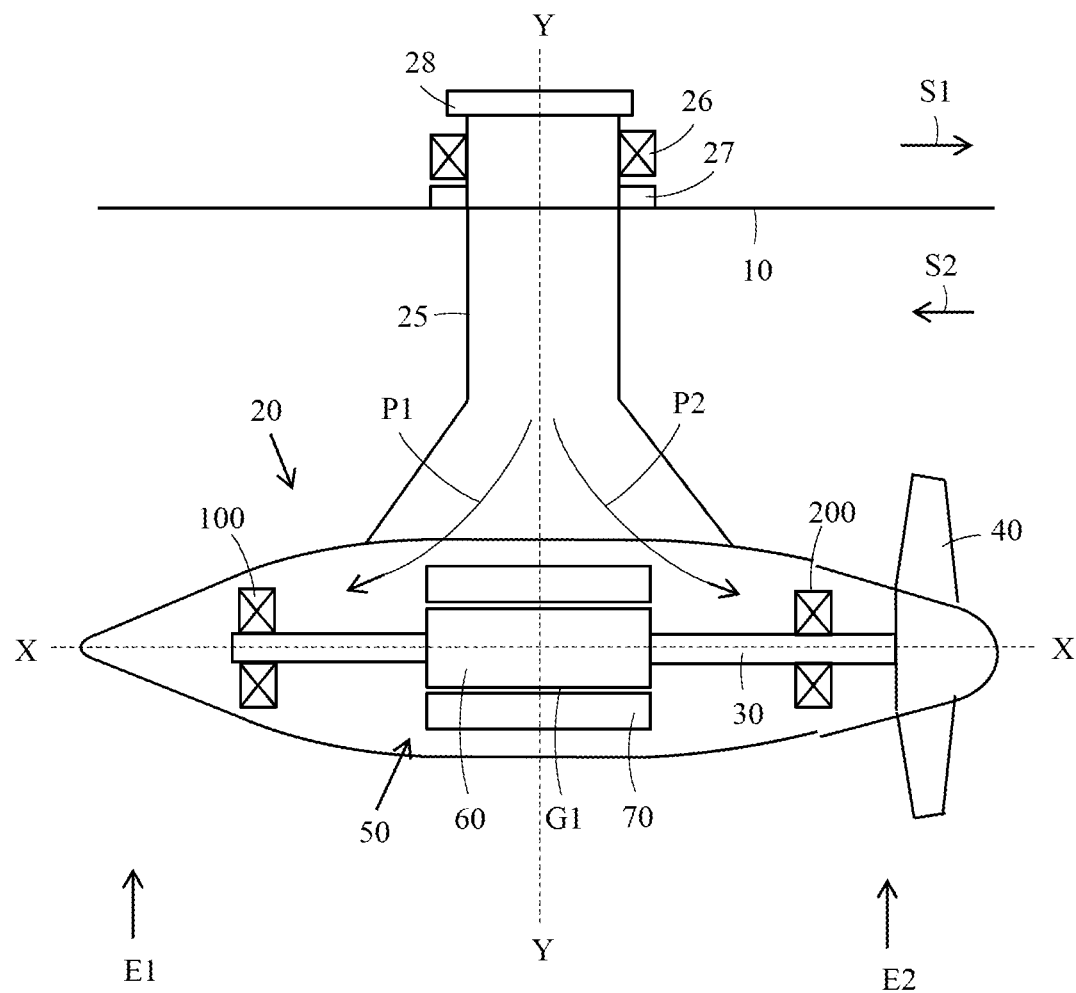
FIG. 1 shows a cross-sectional view of a propulsion unit.

FIG. 1 shows a cross sectional view of a propulsion unit.

The propulsion unit may comprise a housing 20 being supported with a support arm 25 on a hull 10 of a vessel. The housing 20 may have a longitudinal form. The housing 20 may form an enclosure for different equipment of the propulsion unit. The support arm 25 may be rotatably supported on the hull 10 of the vessel. The support arm 25 may be supported with a slewing bearing 26 on the hull 10 of the vessel. A slewing seal 27 may further seal the support arm 25 against the hull 10 of the vessel. A turn wheel 28 may be attached to the support arm 20 within the hull 10 of the vessel. The turn wheel 28 may be operated by as such known electric or hydraulic motors (not shown in the figure).

The housing 20 may have a first end E1 and a second opposite end E2 in a longitudinal direction of the housing 20. The housing 20 may be positioned outside the hull 10 of the vessel. The housing 20 may be positioned under the waterline of the vessel. The housing 20 may be water-tight so that sea water cannot leak into the housing 20. The support arm 25 may be hollow.

The support arm 25 may extend downwards from the hull 10 of the vessel. The support arm 25 may be rotatable around a longitudinal center axis of the support arm 25. The longitudinal center axis Y-Y of the support arm 25 forms thus an axis of rotation of the support arm 25. The longitudinal center axis Y-Y of the support arm 25 may be vertical or inclined in relation to a vertical line. The axis of rotation Y-Y of the support arm 25 forms also the axis of rotation of the propulsion unit 20. The support arm 25 and thereby also the housing 20 may be turned 360 degrees around the axis of rotation Y-Y. The propulsion unit may thus be turned 360 degrees around the axis of rotation Y-Y.

A propeller shaft 30 may be arranged within the housing 20. The propeller shaft 30 may have an axis of rotation X-X. The axis of rotation X-X of the propeller shaft 30 may also form a longitudinal axis of the housing 20. The propeller shaft 30 may protrude out from at least one end E1, E2 of the housing 20. The propeller shaft 30 protrudes out from the second end E2 of the housing 20 in the embodiment shown in the figures. The propeller shaft 30 may be rotatably supported within the housing 20 with bearings 100, 200. A first bearing 100 may be positioned at the first end E1 of the housing 20. A second bearing 200 may be positioned at the second end E2 of the housing 20. The first bearing 100 and the second bearing 200 may be positioned in a respective bearing house. The bearing house may be supported with a support construction on the housing 20 within the housing 20. The rotational axis X-X of the propeller shaft 30 may extend in the longitudinal direction of the housing 20.

A propeller 40 may be attached to the propeller shaft 30 outside at least one end E1, E2 of the housing 20. A propeller 40 is attached to the propeller shaft 30 outside the second end E2 of the housing 20 in the embodiment shown in the figures. The propeller 40 may rotate with the propeller shaft 30. The propeller 40 may be a pulling propeller i.e., the propeller 40 pulls the vessel forwards in a first direction S1. The first direction S1 is the normal driving direction of the vessel. The propeller 40 could, however, also be rotated in an opposite direction in order to reverse the vessel in a second direction S2 opposite to the first direction S1. Reversing of the vessel may be needed e.g., when leaving and approaching harbors.

The propulsion unit may be positioned at an aft end of the vessel. The first end E1 of the housing 20 may form an aft end of the housing 20 and the second end E2 of the housing 20 may form a front end of the housing 20 when the propeller 40 pulls the vessel forwards in the first direction S1.

Figure 2:
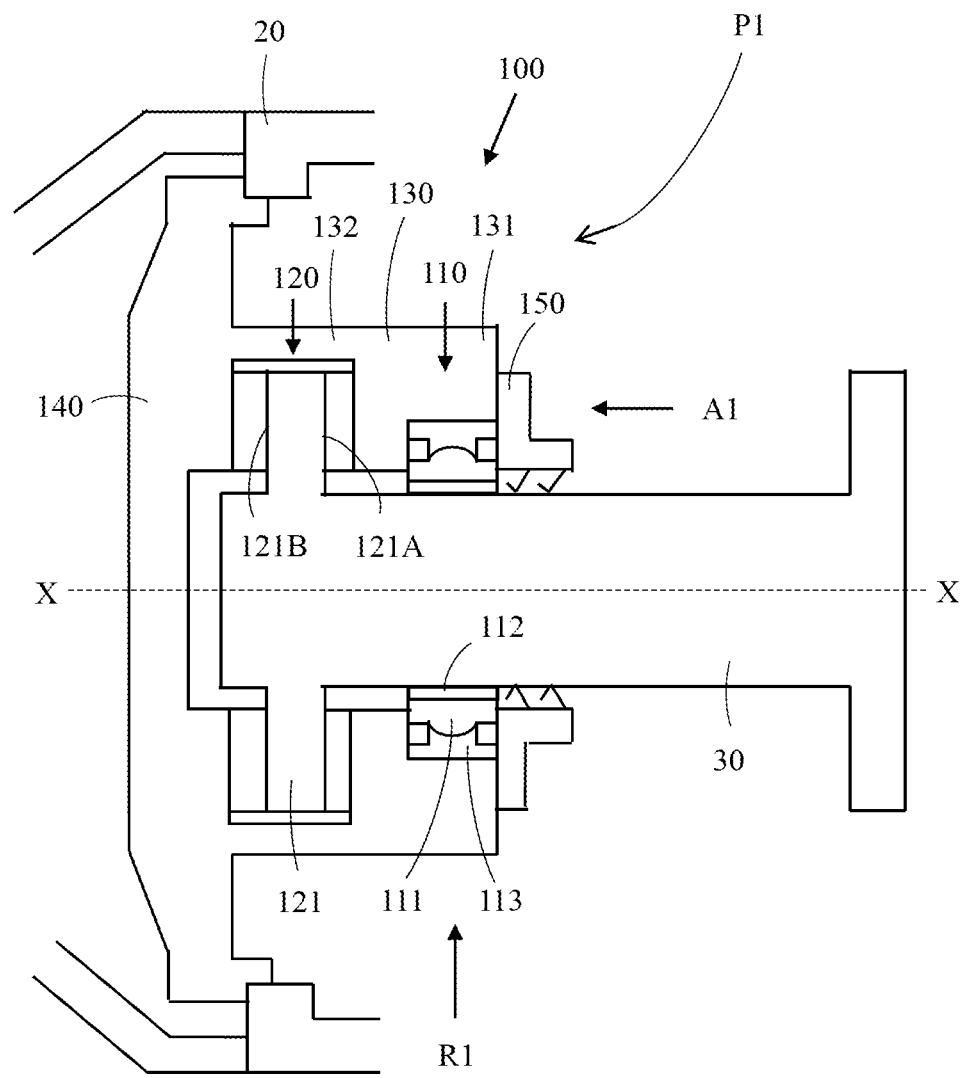
FIG. 2 shows a cross-sectional view of a first bearing.

The first bearing 100 may comprise a first radial bearing and a first thrust bearing (shown in FIG. 2).

The propeller shaft 30 may be driven by a motor 50. The motor 50 may be an electric motor. The electric motor 50 may be positioned in the housing 20. The electric motor 50 may comprise a rotor 60 connected to the propeller shaft 30 and a stator 70 surrounding the rotor 60. The rotor 60 rotates with the propeller shaft 30. The stator 70 may be stationary supported within the housing 20. There is an air gap G1 between the outer surface of the rotor 60 and the inner surface of the stator 70. The propeller shaft 30 may pass through the electric motor 50. Opposite end portions of the propeller shaft 30 may protrude from respective axial ends of the electric motor 50.

Electric power to the electric motor 50 may be provided from the inside of the vessel. One or more generators being driven by combustion engines may be positioned in the vessel. The electric power produced with the generators within the vessel may be transferred by a slip-ring arrangement positioned in connection with the upper part of the support arm 25 to the electric motor within the housing 20.

The figure shows an embodiment in which the support arm 25 and thereby also the housing 20 may be turned 360 degrees around the axis of rotation Y-Y. The propulsion unit may thus be turned 360 degrees around the axis of rotation Y-Y. The propulsion unit could on the other hand be stationary in relation to the hull 10 of the vessel. The support arm 25 would in such an embodiment be stationary. The support arm 25 would thus not be rotatable around the axis of rotation Y-Y.

The support arm 25 may be hollow providing a passage from the inside of the hull 10 of the vessel through the support arm 25 down to the housing 20. The passage may pass through the center of the support arm 25 down to the housing 20. There may be hatches or doors opening a passage from the vertical center passage towards both axial X-X ends E1, E2 of the housing 20. A first passage P1 may lead from the support arm 25 to the housing 20 towards the first axial X-X end E1 of the housing 20. The first passage P1 provides access from the support arm 25 through the housing 20 to the first bearing 100. A second passage P2 may lead from the support arm 25 to the housing 20 towards the second axial X-X end E2 of the housing 20. The second passage P2 provides access from the support arm 25 through the housing 20 to the second bearing 200.

FIG. 2 shows a cross-sectional view of a first bearing.

The first bearing 100 may comprise a first radial bearing 110 and a first thrust bearing 120. The first radial bearing 110 may be positioned axially X-X inside the first thrust bearing 120. The first radial bearing 110 may be a sliding bearing. The first thrust bearing 120 may also be a sliding bearing. The first radial bearing 110 and the first thrust bearing 120 may be positioned in separate bearing housings 131, 132 or in a common bearing housing 130. The separate bearing houses 131, 132 may be attached to each other. Each of the bearing houses 131, 132 or the common bearing house 130 may be supported with a support construction on the housing 20 within the housing 20.

The first radial bearing 110 may comprise a first support part 111 surrounding the propeller shaft 30. The first support part 111 may be stationary. The shaft 30 may thus rotate within the first support part 111. The first support part 111 may comprise a bearing surface 112 positioned against the outer surface of the propeller shaft 30. Lubrication may be used between the outer surface of the propeller shaft 30 and the bearing surface 112. The first support part 111 may be formed of a cylindrical sleeve comprising two or more circle segments forming the cylindrical sleeve. The circle segments may be positioned adjacent to each other so that a cylinder is formed. The bearing surface 112 may extend along the inner surface of the cylindrical sleeve. The bearing surface may be formed of circle segments being positioned so that opposite edges of adjacent circle segments attach each other or so that opposite edges of adjacent circle segments are positioned at an angular distance from each other.

The first support part 111 may be supported in a second support part 113 surrounding the first support part 111. An outer surface of the first support part 111 may have an outwardly curved form and the second support part 113 may have an inwardly curved form. The curved portion of the first support part 111 may be received in the curved nest of the second support part 113. The first support part 111 and the second support part 113 may thus move in relation to each other along the curved surfaces when the propeller shaft 30 bends. The second support part 113 may be supported in the bearing housing 130, 131 of the first radial bearing 110.

Figure 6:
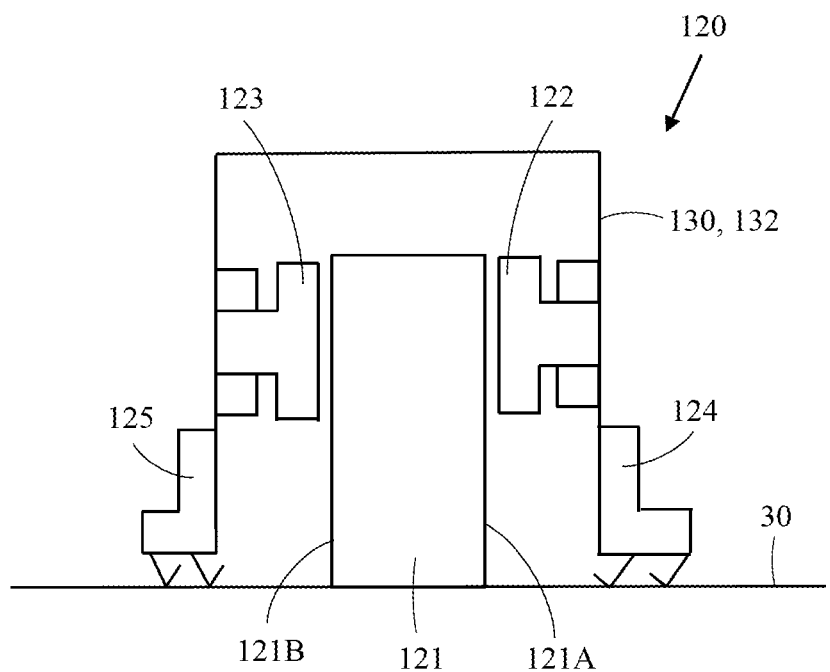
FIG. 6 shows a cross-sectional view of a thrust bearing.

The first thrust bearing 120 may comprise a collar 121 protruding radially outwards from the propeller shaft 30. The collar 121 may be firmly attached to the propeller shaft 30. The collar 121 may thus rotate with the propeller shaft 30. The collar 121 may comprise two opposite side surfaces 121A, 121B. Each side surface 121A, 121B may be supported on a slide piece (FIG. 6). The slide pieces keep the collar 121 and thereby the propeller shaft 30 in a correct axial position.

The bearing house 132 of the first thrust bearing 120 or the common bearing house 130 of the first radial bearing 110 and the first thrust bearing 120 may be attached to a fastening flange 140. The fastening flange 140 may be attached to support constructions in the housing 20. An electrical insulation layer may be used between the bearing house 130, 132 and the fastening flange 140. The fastening flange 140 may be positioned axially outside the first thrust bearing 120 providing room in the radial direction between the housing 20 and the radial outside surface of the first thrust bearing 120. It would, however, also be possible to add additional support axially inwards from the support flange 140 between the first bearing 100 and the housing 20. The additional support could be arranged with radial support arms extending between the first bearing 100 and the housing 20. The radial support arms could be distributed along a perimeter of a radial outer surface of the first bearing so that access would be provided between the support arms. The radial support arms could e.g., be provided in the area between the first radial bearing 110 and the first thrust bearing 120 in order to provided radial access to the first radial bearing 110 and the first thrust bearing 120.

When the first radial bearing 110 has a bearing house 131 of its own, then said bearing house 131 of the first radial bearing 110 may be supported on the bearing house 132 of the first thrust bearing 120. The bearing house 131 of the first radial bearing 110 may be bolted on the bearing house 132 of the first thrust bearing 120. The first bearing 100 may then be supported on the housing 20 only through the bearing house 132 of the first thrust bearing 120. The bearing house 132 of the first thrust bearing 120 may thus be supported on the housing 20 axially X-X outwards from the first radial bearing 110. The same may apply to the situation in which the first radial bearing 110 and the first thrust bearing 120 are enclosed in a common bearing house 130. The common bearing house 130 may then be supported on the housing 20 axially X-X outwards from the first radial bearing 110. The first bearing 100 may thus in this embodiment be supported on the housing 20 axially outwards from the first radial bearing 110. Radial access to the first radial bearing 110 may thus be provided. The fastening flange 140 may be positioned axially X-X outwards from the first radial bearing 110.

The first radial bearing 110 may be sealed with a first seal 150 at an axially X-X inner end of the first radial bearing 110. The first seal 150 may act on the outer surface of the propeller shaft 30 or on a liner provided on the outer surface of the propeller shaft 30. The first seal 150 may be positioned against an axial X-X inner surface of the bearing house 130, 131 of the first radial bearing 110. The first seal 150 prevents lubrication fluid from leaking along the propeller shaft 30 from the first radial bearing 110 into the housing 20. The first seal 150 may be removable so that access A1 to the first radial bearing 110 is provided from the axially X-X outer end of the bearing house 130, 131 of the first radial bearing 110 in order to service and/or change the first radial bearing 110.

The first radial bearing 110 may be service and/or changed in the axial direction A1 from the inside of the housing 20 when the first seal 150 has been removed. The construction of the first radial bearing 110 may thus be such that it enables service and/or change of the first radial bearing 110 in the axial direction A1 from the inside of the housing 20.

The first radial bearing 110 could, however, also be constructed so that service and/or change of the first radial bearing 110 may be done in the radial direction R1 from the radial outer surface of the first bearing house 130 from the inside of the housing 20. Access to the first radial bearing 110 would then be provided from the radial outer surface of the first bearing house 130. The construction of the first radial bearing 110 would then have to be such that service and/or change of the first radial bearing 110 in the radial direction R1 is possible. There is enough space between the radial outer surface of the bearing housing 131, 130 of the first radial bearing 110 and the housing 20 so that radial access to the first radial bearing 110 is possible.

The first passage P1 leads from the support arm 25 to the first bearing 100 within the housing 20 providing access to the first bearing 100. The first radial bearing 110 may be changed and/or serviced in the axial direction and/or in the radial direction from the inside of the housing 20. The first thrust bearing 120 may be serviced in the radial direction from the inside of the housing 20. The whole first bearing 100 may thus be changed and/or serviced from the inside of the housing 20. No dry docking of the vessel is thus needed in order to service the first bearing 100.

Figure 3:
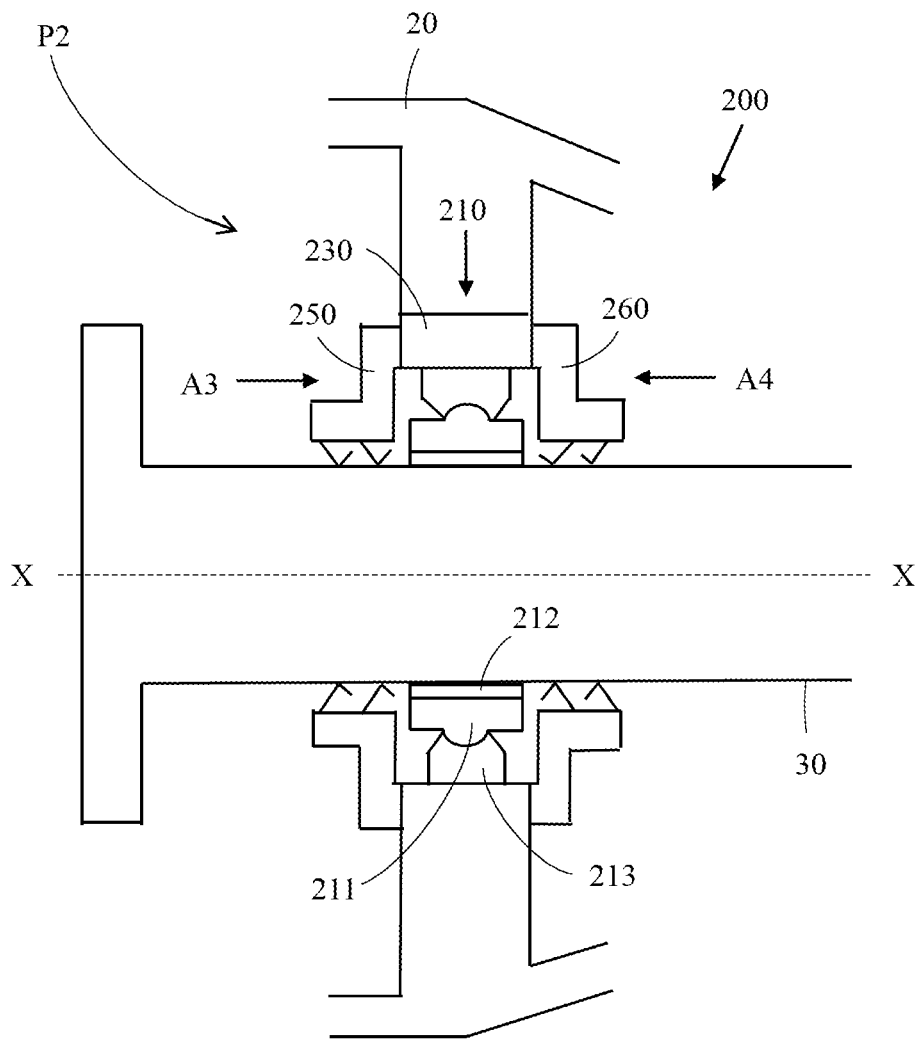
FIG. 3 shows a cross-sectional view of a second bearing.

FIG. 3 shows a cross-sectional view of a second bearing.

The second bearing 200 may comprise a second radial bearing 210. The second radial bearing 210 may be a sliding bearing. The second radial bearing 210 may comprise a first support part 211 surrounding the propeller shaft 30. The first support part 211 may be stationary. The propeller shaft 30 may rotate within the first support part 211. The first support part 211 may comprise a bearing surface 212 positioned against an outer surface of the propeller shaft 30. Lubrication may be used between the outer surface of the propeller shaft 30 and the bearing surface 212. The first support part 211 may be formed of a cylindrical sleeve comprising two or more circle segments forming the cylindrical sleeve. The circle segments may be positioned adjacent to each other so that a cylinder is formed. The bearing surface 212 may extend along the inner surface of the cylindrical sleeve. The bearing surface may be formed of circle segments. The circle segments may be positioned so that opposite edges of adjacent circle segments attach each other or so that opposite edges of adjacent circle segments are positioned at an angular distance from each other.

The first support part 211 may be supported in a second support part 213 surrounding the first support part 211. An outer surface of the first support part 211 may have an outwardly curved form and the second support part 213 may have an inwardly curved form. The curved portion of the first support part 211 may be received in the curved nest of the second support part 213. The first support part 211 and the second support part 213 may thus move in relation to each other along the curved surfaces when the propeller shaft 30 bends. The second support part 213 may be supported in a bearing house 230. The bearing house 230 may be supported on support constructions in the housing 20.

The second radial bearing 210 may be sealed with a second seal 250 at an axially X-X inner end of the second radial bearing 210. The second seal 250 may act on the outer surface of the propeller shaft 30 or on a liner provided on the outer surface of the propeller shaft 30. The second radial bearing 210 may further be sealed with a third seal 260 at an axially X-X outer end of the second radial bearing 210. The third seal 260 may act on the outer surface of the propeller shaft 30 or on a liner provided on the outer surface of the propeller shaft 30. The second seal 250 and the third seal 260 prevent lubrication fluid from leaking along the outer surface of the propeller shaft 30 from the second radial bearing 210 into the housing 20 and/or into the sea. The second seal 250 and the third seal 260 may be removable. Removal of the second seal 250 provides access A3 in the axial X-X direction from the inside to of the housing 20 to the second radial bearing 210. Removal of the third seal 260 provides access A4 in the axial direction from the outside of the housing 20 to the second radial bearing 210 in order to service and/or change the second radial bearing 210.

Removal of the second seal 250 makes it possible to service and/or change the second radial bearing 210 in the axial X-X direction from the inside of the housing 20. Dry docking of the vessel would not be needed in order to change the second radial bearing 210.

Removal of the third seal 260 makes it possible to service and/or change the second radial bearing 210 in the axial X-X direction from the outside of the housing 20. This could be done during dry docking of the vessel.

The second radial bearing 210 could instead of being provided with a seal 250, 260 at both axial X-X ends, be provided with a seal 250 only at an axially X-X inner end of the second radial bearing 210 or only with a seal 260 at an axially X-X outer end of the second radial bearing 210. Access to the second radial bearing 210 would then be provided in the axial X-X direction only from the inside of the housing 20 or only from the outside of the housing 20.

The second radial bearing 210 could also be constructed so that change and/or or service of the second radial bearing 210 could be done in the radial direction. Access to the second radial bearing 210 would then have to be arranged from the radial direction. A hatch could be arranged in the support structures of the bearing house 230 providing an axial passage into the support structures of the bearing house 230.

The second passage P2 leads from the support arm 25 to the second bearing 200 within the housing 200 providing access to the second bearing 200. The second bearing 200 may be changed and/or serviced in the axial direction and/or in the radial direction from the inside of the housing 20. No dry docking of the vessel is thus needed for changing and/or servicing the second bearing 200.

Figure 4:
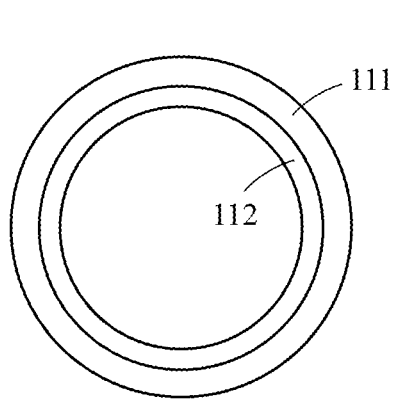
FIGS. 4 and 5 shows cross-sectional views of radial bearings.
Figure 5:
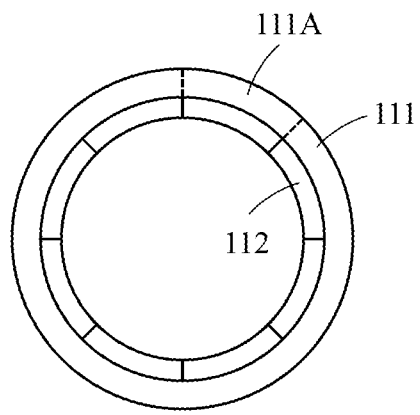

FIGS. 4 and 5 shows cross-sectional views of radial bearings.

The radial bearings shown in FIGS. 4 and 5 may be sliding bearings.

FIG. 4 shows a radial bearing in which the bearing surface 112 is formed of a cylindrical surface within the first support part 111. The cylindrical bearing surface 112 may comprise two cylindrical halves. The construction of the radial bearing makes it possible to service and/or change the radial bearing in an axial X-X direction along the propeller shaft 30.

FIG. 5 shows a radial bearing in which the bearing surface 112 is formed of circle segments within the first support part 111. The first support part 111 may comprise a hatch 111A through which the bearing surfaces 112 may be changed. The bearing may during change and/or service be turned in a revolver fashion in order to be able to change the bearing surfaces in the radial direction from the hatch. The construction of the radial bearing makes it possible to service and/or change the radial bearing from the radial outer surface of the bearing house.

The radial bearing may be changed and/or serviced in the radial direction from the inside of the housing 20. The slide pieces in the form of circle segments within the bearing may be changed and/or serviced in the radial direction from the inside of the housing 20. The radial bearing may be a revolver type bearing. There may be a service hatch on a radial surface of the bearing house of the radial bearing. The service hatch may open a segment of the radial surface of the bearing house of the radial bearing and provide access to the slide pieces in the form of circle segments within the radial bearing. The radial bearing may then be turned like a revolver in order to remove the slide pieces in the form of circle segments one by one from the radial bearing. New slide pieces in the form of circle segments may be inserted in the same manner one by one.

FIG. 6 shows a cross sectional view of a thrust bearing.

The first thrust bearing 120 may comprise a collar 121 protruding radially outwards from the propeller shaft 30. The collar 121 may be firmly attached to the propeller shaft 30. The collar 121 may thus rotate with the propeller shaft 30. The collar 121 may comprise two opposite side surfaces 121A, 121B. Each side surface 121A, 121B may be supported on a slide piece 122, 123. The slide pieces 122, 123 keep the collar 121 and thereby the propeller shaft 30 in a correct axial position. The slide pieces 122, 123 may be provided with a bearing surface gliding against the side surfaces 121A, 121B of the collar 121.

The slide pieces 122, 123 may be supported on the bearing house 130, 132. The bearing house 130, 132 may be firmly supported within the housing 20. The bearing house 130, 132 may sealed at opposite axial sides with a sealing 124, 125 against the outer surface of the propeller shaft 30. The seals 124, 125 prevent lubrication fluid from penetrating along the outer surface of the propeller shaft 30 out from the first thrust bearing 120.

The slide pieces 122, 123 may have a cylindrical from. The first thrust bearing 120 may be changed and/or serviced in the radial direction from the inside of the housing 20. The slide pieces 122, 123 may be changed and/or serviced in the radial direction from the inside of the housing 20. The first thrust bearing 120 may be a revolver type bearing. There may be a service hatch on a radial surface of the bearing house of the first thrust bearing 120. The service hatch may open a segment of the radial surface of the bearing house of the first thrust bearing 120 and provide access to the slide pieces 122, 123 within the first thrust bearing 120. The first thrust bearing 120 may then be turned like a revolver in order to remove the slide pieces 122, 123 one by one from the first thrust bearing 120. New slide pieces 122, 123 may be inserted in the same manner one by one.

A lubrication fluid may be directed into the first thrust bearing 120 in order to provide lubrication between the slide pieces 122, 123 and the side surfaces 121A, 121B of the collar 121.

The figures show an embodiment in which the first bearing 100 is positioned at the first axial X-X end E1 of the housing 20 and the second bearing 200 is positioned at the second axial X-X end E2 of the housing 20. This is an advantageous embodiment. The form of the housing 20 may be optimized and the outer perimeter of the housing 20 may be kept small at the front end i.e., the second end E2 of the housing E2.

The situation could, however, be reversed so that the first bearing 100 would be positioned at the second end E2 of the housing 20 and the second bearing 200 would be positioned at the first end E1 of the housing 20. The first radial bearing 110 would still be positioned axially X-X inwards in relation to the first thrust bearing 120 also in this embodiment.

The figures show an embodiment in which there is a propeller 40 only outside one end, i.e., outside the second end E2 of the housing 20. This is an advantageous embodiment. There could, however, also be a propeller 40 outside both ends of the housing 20, i.e., one propeller 40 outside the first end E1 of the housing 20 and one propeller 40 outside the second end E2 of the housing 20.

The figures show an embodiment in which the first radial bearing 110 and the first thrust bearing 120 are positioned in a common first bearing to house 130. This is an advantageous embodiment. The first radial bearing 110 and the first thrust bearing 120 could, however, instead be positioned in separate bearing houses 131, 132.

The first radial bearing 110 and the second radial bearing 210 may be sliding bearings.

The figures show an embodiment in which the propeller 40 is a pulling propeller. The invention may naturally also be applied in a situation in which the propeller 40 is a pushing propeller.

The figures show an embodiment in which the propeller 40 is formed of only one propeller. The invention may naturally also be applied in a situation in which the propeller 40 is formed of two or more propellers, e.g., two contra-rotating propellers.

The figures show an embodiment in which the propeller 40 is rotating freely in sea water. The propeller 40 may naturally also be surrounded with a thrust ring.

The invention and its embodiments are not limited to the examples described above but may vary within the scope of the claims.

The invention claimed is:

1. A propulsion unit comprising:
    a housing being supported with a support arm on a hull of a vessel, the housing having a first end and a second opposite end in a longitudinal direction of the housing,
    a propeller shaft extending in the longitudinal direction of the housing within the housing, the propeller shaft having an axis of rotation and being rotatably supported within the housing with a first bearing and a second bearing,
    a propeller being attached to at least one end of the propeller shaft outside the housing,
    wherein the first bearing includes a first radial bearing and a first thrust bearing, the first radial bearing being a sliding bearing positioned axially inside the first thrust bearing, the first bearing being positioned at the first end of the housing and the second bearing being positioned at the second end of the housing or vice a versa,
    wherein a passage is arranged from the support arm to the first bearing inside the housing providing a route for service personnel to reach the first bearing in order to be able to service and/or change the first bearing.

2. The propulsion unit as claimed in claim 1, wherein access to the first radial bearing is provided in a radial direction from a radial surface of the first radial bearing in order to service and/or change the first radial bearing.

3. The propulsion unit as claimed in claim 1, wherein access to the first radial bearing is provided in the axial direction from an axial inner end of the first radial bearing in order to service and/or change the first radial bearing.

4. The propulsion unit as claimed in claim 1, wherein access to the first thrust bearing is provided in a radial direction from a radial surface of the first thrust bearing in order to service and/or change the first thrust bearing.

5. The propulsion unit as claimed in claim 1, wherein the first radial bearing is sealed with a first seal at an axially inner end of the first radial bearing, the first seal being detachable so that removal of the first seal provides access in the axial direction to the first radial bearing in order to service and/or change the first radial bearing.

6. The propulsion unit as claimed in claim 1, wherein the first thrust bearing comprises a collar rotating with the propeller shaft and protruding radially outwards from the propeller shaft, the opposite side surfaces of the collar being rotatably supported on slide pieces supported in a bearing house of the first thrust bearing.

7. The propulsion unit as claimed in claim 1, wherein the first radial bearing and the first thrust bearing are positioned in separate bearing houses.

8. The propulsion unit as claimed in claim 1, wherein the first radial bearing and the first thrust bearing are positioned in a common bearing house.

9. The propulsion unit as claimed in claim 1, wherein the second bearing comprises a second radial bearing.

10. The propulsion unit as claimed in claim 9, wherein the second radial bearing is a sliding bearing.

11. The propulsion unit as claimed in claim 1, wherein the second bearing is sealed with a second seal at an axially inner end of the second bearing, the second seal being detachable so that removal of the second seal provides access to the second bearing in the axial direction from the inside of the housing in order to service and/or change the second bearing.

12. The propulsion unit as claimed in claim 1, wherein the propeller shaft is driven with an electric motor, the electric motor including a rotor attached to the propeller shaft and a stator surrounding the rotor.

13. The propulsion unit as claimed in claim 1, wherein the support arm is rotatably supported on the hull of the vessel so that the support arm is turnable 360 degrees around a longitudinal center axis of the support arm, whereby also the housing turns 360 degrees along with the support arm 25.

14. A vessel, comprising at least one propulsion unit including:
    a housing being supported with a support arm on a hull of a vessel, the housing having a first end and a second opposite end in a longitudinal direction of the housing,
    a propeller shaft extending in the longitudinal direction of the housing within the housing, the propeller shaft having an axis of rotation and being rotatably supported within the housing with a first bearing and a second bearing,
    a propeller being attached to at least one end of the propeller shaft outside the housing,
    wherein the first bearing includes a first radial bearing and a first thrust bearing, the first radial bearing being a sliding bearing positioned axially inside the first thrust bearing, the first bearing being positioned at the first end of the housing and the second bearing being positioned at the second end of the housing or vice a versa, and wherein a passage is arranged from the support arm to the first bearing inside the housing providing a route for service personnel to reach the first bearing in order to be able to service and/or change the first bearing.

15. The vessel as claimed in claim 14, wherein access to the first thrust bearing is provided in a radial direction from a radial surface of the first thrust bearing in order to service and/or change the first thrust bearing.

16. The vessel as claimed in claim 14, wherein the first radial bearing is sealed with a first seal at an axially inner end of the first radial bearing, the first seal being detachable so that removal of the first seal provides access in the axial direction to the first radial bearing in order to service and/or change the first radial bearing.

17. The vessel as claimed in claim 14, wherein the first thrust bearing comprises a collar rotating with the propeller shaft and protruding radially outwards from the propeller shaft, the opposite side surfaces of the collar being rotatably supported on slide pieces supported in a bearing house of the first thrust bearing.

18. The vessel as claimed in claim 14, wherein the first radial bearing and the first thrust bearing are positioned in separate bearing houses.

19. A propulsion unit comprising:
a housing being supported with a support arm on a hull of a vessel, the housing having a first end and a second opposite end in a longitudinal direction of the housing,
a propeller shaft extending in the longitudinal direction of the housing within the housing, the propeller shaft having an axis of rotation and being rotatably supported within the housing with a first bearing and a second bearing,
a propeller being attached to at least one end of the propeller shaft outside the housing,
wherein the first bearing includes a first radial bearing and a first thrust bearing, the first radial bearing being a sliding bearing positioned axially inside the first thrust bearing, the first bearing being positioned at the first end of the housing and the second bearing being positioned at the second end of the housing or vice a versa, and
wherein the first radial bearing is sealed with a first seal at an axially inner end of the first radial bearing, the first seal being detachable so that removal of the first seal provides access in the axial direction to the first radial bearing in order to service and/or change the first radial bearing.

* * * * *